(12) United States Patent
Kojima et al.

(10) Patent No.: US 7,771,128 B2
(45) Date of Patent: Aug. 10, 2010

(54) OPTICAL CONNECTOR

(75) Inventors: Seiji Kojima, Hitachi (JP); Kanako Suzuki, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/382,113

(22) Filed: Mar. 9, 2009

(65) Prior Publication Data

US 2010/0086264 A1    Apr. 8, 2010

(30) Foreign Application Priority Data

Mar. 10, 2008    (JP) .............................. 2008-059950

(51) Int. Cl.
- *G02B 6/36* (2006.01)
- *G02B 6/38* (2006.01)
- *G02B 6/255* (2006.01)
- *C03B 37/15* (2006.01)

(52) U.S. Cl. .............................. 385/53; 385/67; 385/69; 385/91; 385/98; 65/406; 65/407

(58) Field of Classification Search .................... 385/67, 385/69, 91, 98; 65/406, 407
See application file for complete search history.

(56) References Cited

U.S. PATENT DOCUMENTS

| | | | |
|---|---|---|---|
| 4,444,453 A | * | 4/1984 | Kirby et al. .................. 439/583 |
| 4,460,820 A | * | 7/1984 | Matsumoto et al. ......... 219/385 |
| 4,544,234 A | * | 10/1985 | DeVeau et al. ................ 385/98 |
| 4,940,307 A | * | 7/1990 | Aberson et al. ............... 385/98 |
| 5,891,210 A | * | 4/1999 | Watanabe et al. ............. 65/406 |
| 6,242,699 B1 | * | 6/2001 | Greiner et al. ............ 174/75 C |
| 2002/0106164 A1 | | 8/2002 | Sasaoka et al. |
| 2002/0159734 A1 | | 10/2002 | Sasaoka et al. |

FOREIGN PATENT DOCUMENTS

| | | |
|---|---|---|
| JP | 2002-236234 | 8/2002 |
| JP | 2002-323625 | 11/2002 |

* cited by examiner

*Primary Examiner*—Uyen-Chau N Le
*Assistant Examiner*—Chris H Chu
(74) *Attorney, Agent, or Firm*—McGinn IP Law Group, PLLC

(57) ABSTRACT

In an embodiment of the invention, an optical connector for optically coupling respective end faces of two optical fiber cables including an optical fiber composed of a core and a cladding and a covering layer covering the optical fiber includes a protection sleeve, a cable insertion tube disposed in the protection sleeve for inserting thereinto and butting the respective end faces of the two optical fiber cables, an uncured refractive index matching material disposed between the protection sleeve and the cable insertion tube, and a supply hole formed in the cable insertion tube for supplying the uncured refractive index matching material to an inside of the cable insertion tube. The cable insertion tube includes a cable receiving room for receiving an end of the two optical fiber cables inserted, a fiber receiving room for receiving the optical fiber, and a covering removal member formed at a boundary of the cable receiving room and the fiber receiving room for removing the covering layer.

8 Claims, 3 Drawing Sheets

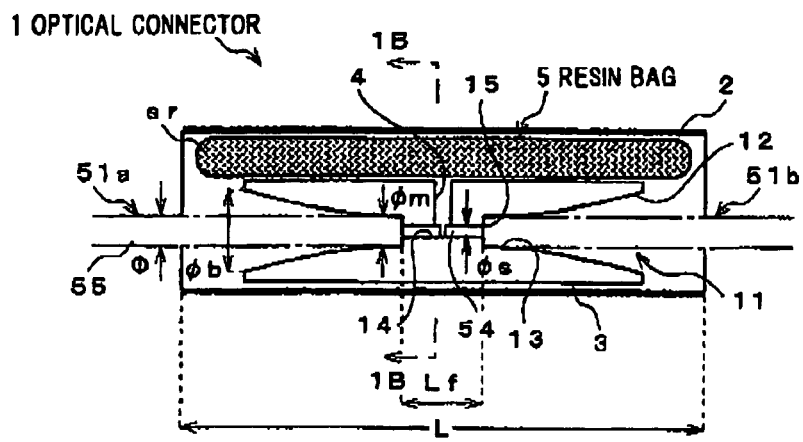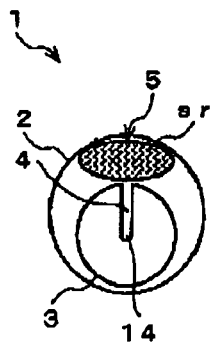
FIG.1A / FIG.1B
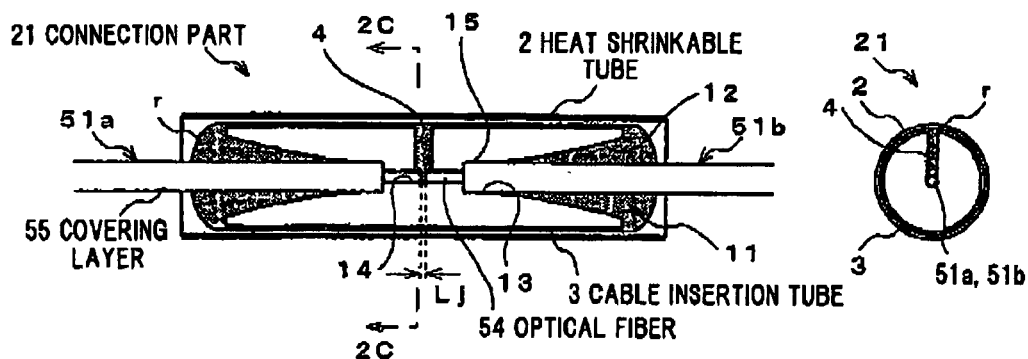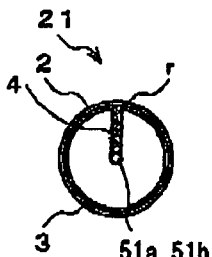
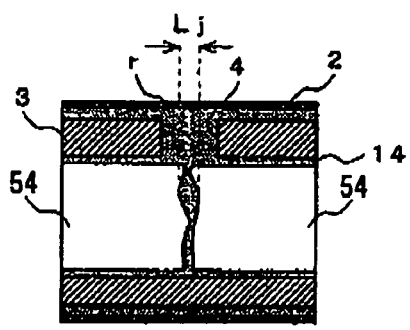
FIG.2A / FIG.2B / FIG.2C

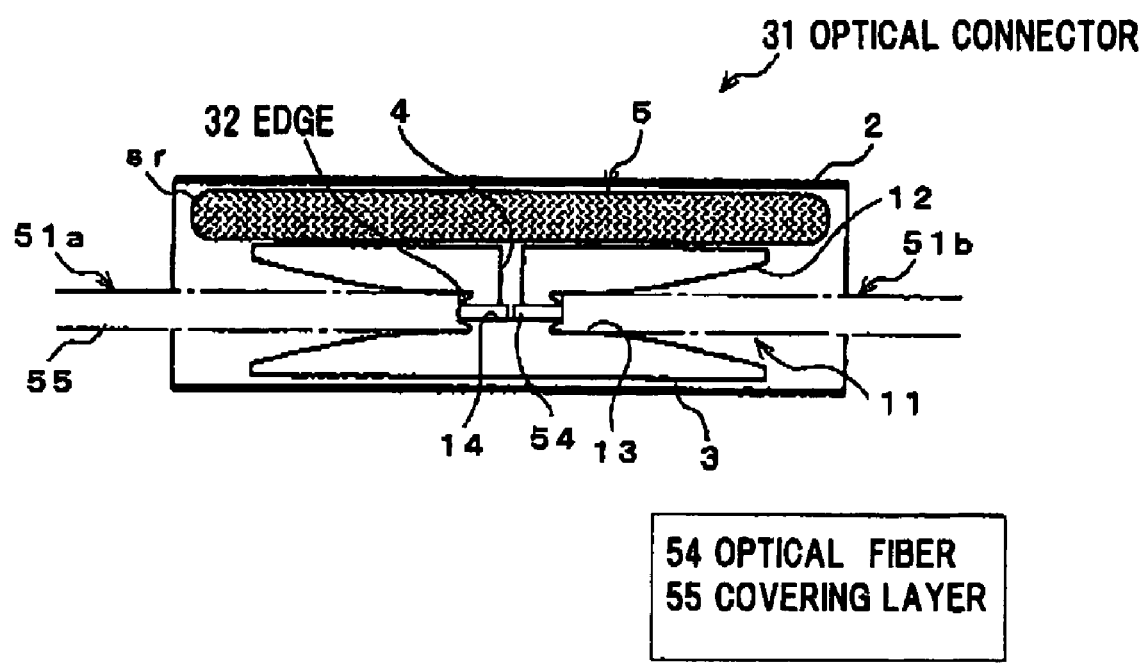
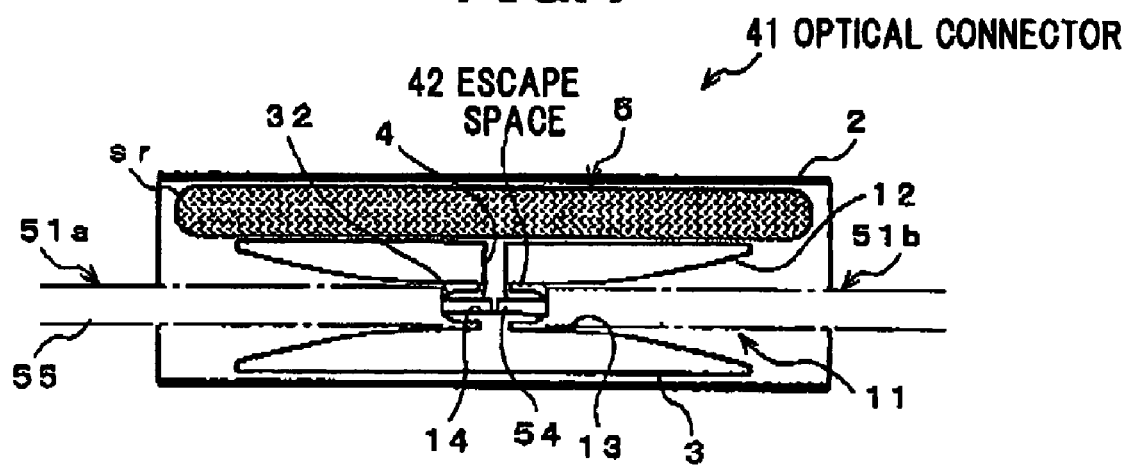

OPTICAL CONNECTOR

The present application is based on Japanese patent application No. 2008-059950 filed Mar. 10, 2008, the entire contents of which are incorporated herein by reference.

BACKGROUND OF THE INVENTION

1. Field of the Invention

This invention relates to an optical connector for connecting each other two optical fibers composed of a core and a cladding.

2. Description of the Related Art

In general, for connecting two optical fibers, a physical connection method is used in which the optical fibers or ferules with the optical fiber inserted thereinto are butted each other. For example, mechanical splice, SC optical connector, FC optical connector, MT optical connector can be used in the method.

A method for connecting two optical fibers is proposed in which a covering of an optical fiber cable is removed at its end, the exposed optical fiber is cleaned and cut by using a specialized fiber cutter, the optical fiber cores are connected by using a specialized fusion connector, and the fusion connection portion is protectively covered with a protection sleeve.

The related prior arts to the invention are, e.g., JP-A-2002-236234 and JP-A-2002-323625.

However, all of the conventional connection methods need, prior to connecting the optical fiber cores, many steps or specialized tools for removal of the covering of the optical fiber cable, and cleaning, cutting, polishing etc. of the optical fiber. Thus, the conventional methods require a good deal of time, cost and steps, and they are difficult connection technique for everyone except workers skilled in optical techniques.

SUMMARY OF THE INVENTION

It is an object of the invention to provide an optical connector that allows easy handling of optical fibers in connection work such that every worker can easily conduct the connection work.

(1) According to one embodiment of the invention, an optical connector for optically coupling respective end faces of two optical fiber cables comprising an optical fiber comprising a core and a cladding and a covering layer covering the optical fiber comprises:

a protection sleeve;

a cable insertion tube disposed in the protection sleeve for inserting thereinto and butting the respective end faces of the two optical fiber cables;

an uncured refractive index matching material disposed between the protection sleeve and the cable insertion tube; and a supply hole formed in the cable insertion tube for supplying the uncured refractive index matching material to an inside of the cable insertion tube, wherein the cable insertion tube comprises a cable receiving room for receiving an end of the two optical fiber cables inserted, a fiber receiving room for receiving the optical fiber, and a covering removal member formed at a boundary of the cable receiving room and the fiber receiving room for removing the covering layer.

In the above embodiment (1), the following modifications, changes and a combination thereof can be made.

(i) The covering removal member comprises a step or an edge formed at the boundary of the cable receiving room.

(ii) The cable insertion tube further comprises an escape space around the cable receiving room for allowing escape and accommodation of the covering layer removed by the covering removal member.

(iii) The optical connector further comprises:
a bag with the uncured refractive index matching material therein or a tube formed of the uncured refractive index matching material, wherein the bag or the tube is enclosed in the cable insertion tube.

(iv) The cable insertion tube is formed tapered such that it has a large diameter at both ends thereof for inserting the optical fiber cables, and a small diameter at a central region according to an outside diameter of the optical fiber cables.

(v) The cable insertion tube comprises a metal tube or a glass tube.

(vi) The uncured refractive index matching material has nearly a same refractive index as the core after curing.

(vii) The refractive index matching material comprises a heat curable resin, a ultraviolet curable resin, a cyanoacrylate room-temperature curing instantaneous adhesive, a light curing instantaneous adhesive, or an one or two-component epoxy resin room-temperature curing instantaneous adhesive.

BRIEF DESCRIPTION OF THE DRAWINGS

The preferred embodiments according to the invention will be explained below referring to the drawings, wherein:

FIG. 1A is a cross sectional view showing an optical connector in a first preferred embodiment according to the invention;

FIG. 1B is a cross sectional view cut along a line 1B-1B in FIG. 1A;

FIG. 2A is a cross sectional view showing an optical connector (connection part of optical fiber cores) with optical fiber cores connected each other therein;

FIG. 2B is an enlarged cross sectional view showing a central part of the optical connector in FIG. 2A;

FIG. 2C is a cross sectional view cut along a line 2C-2C in FIG. 2A;

FIG. 3 is a cross sectional view showing an optical connector in a second preferred embodiment according to the invention;

FIG. 4 is a cross sectional view showing an optical connector in a third preferred embodiment according to the invention;

DETAILED DESCRIPTION OF THE PREFERRED EMBODIMENTS

First Embodiment

Figure 5:
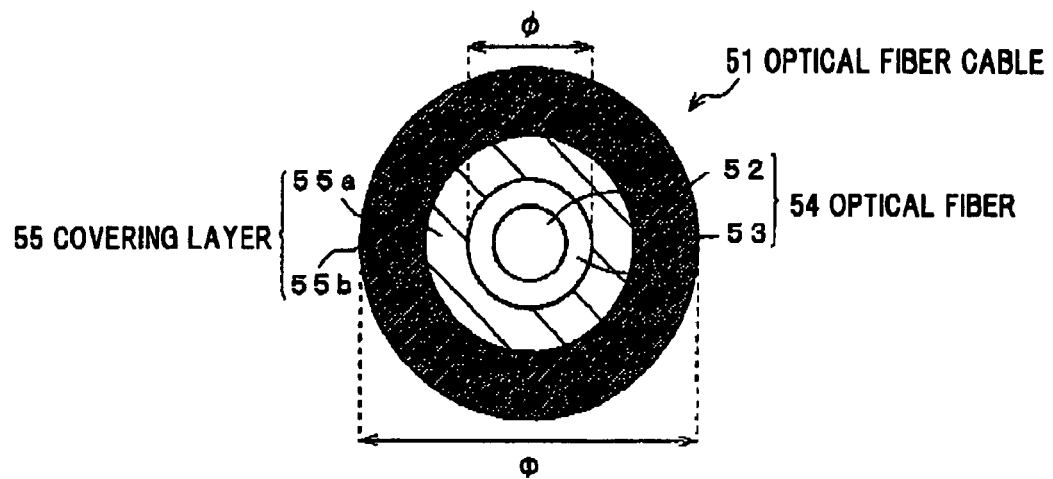
FIG. 5 is a cross sectional view showing an example of an optical fiber cable to be connected by the optical connector in FIG. 1A.

The first preferred embodiment of the invention will be explained below referring to the drawings.

FIG. 5 is a cross sectional view showing an example of an optical fiber cable to be connected by an optical connector in the embodiments of the invention.

As shown in FIG. 5, an optical fiber cable 51 is constructed of an optical fiber (or optical fiber core) 54 composed of a core 52 and a cladding 53 covering the periphery of the core 52, and a covering layer 55 covering the periphery of the optical fiber 54. In this embodiment, as the optical fiber 54, a single-mode optical fiber is used that is generally in wide use, mainly formed of silica glass, and 125 μm in outside diameter φ. The core 52 is about 1.463 in refractive index by adding a refractive index adjuster such as Ge into pure silica. The cladding 53 is formed of pure silica and 1.458 in refractive index.

The covering layer 55 is composed of an inner covering layer (or primary layer) 55a as a buffer layer, and an outer covering layer (or secondary layer) 55b as a protection sheath. In this embodiment, the inner covering layer 55a and the outer covering layer 55b are formed of ultraviolet (UV) curable resin, and the optical fiber cable 51 is 250 μm in outside diameter Φ.

FIG. 1A is a cross sectional view showing an optical connector in the first embodiment of the invention. FIG. 1B is a cross sectional view cut along a line 1B-1B in FIG. 1A.

As shown in FIGS. 1A and 1B, the optical connector 1 of the embodiment is constructed of heat shrinkable tube 2 as a protection sleeve, a cable insertion tube 3 for butting optical fiber cables 51a and 51b therein by inserting end faces, which are formed only by cutting, of the optical fiber cables 51a and 51b, and an uncured refractive index matching resin 'sr' provided in the heat shrinkable tube 2.

In this embodiment, the heat shrinkable tube 2 is exemplarily used as a protection sleeve. However, instead of the heat shrinkable tube 2, a protection sleeve may be used which is conventionally used for protecting the periphery of an optical fiber after welding joint. The heat shrinkable tube 2 is desirably formed of a transparent or semi-transparent material in order to check the optical fiber cables 51a, 51b with eyes during connection work.

The end faces formed only by cutting of the optical fiber cables 51a and 51b mean those that are formed by directly cutting the end of the optical fiber cables 51a, 51b to be connected by using the ordinary tool such as scissors or nipper (without using a special tool such as a fiber cutter) without removing the covering layer 55 as shown in FIG. 5. The end faces are not polished.

The cable insertion tube 3 is a hard tubular member which has a typical cylindrical shape in appearance. The cable insertion tube 3 is formed with a metal tube of a metal such as SUS (i.e., stainless steel), Al and Cu with relatively high strength and high thermal conductivity or formed with a glass tube of industrial glass, silica glass etc. In this embodiment, a SUS tube is used that is balanced on the aspect of high strength, high thermal conductivity, low cost and availability.

The cable insertion tube 3 is provided with at least one resin supply hole 4 that penetrates radially from a periphery at a central part in the longitudinal direction to an inner wall of the tube for supplying the uncured refractive index matching resin 'sr' to the central part of the cable insertion tube 3.

In this embodiment, one resin supply hole 4 is formed on the side of the refractive index matching resin 'sr' disposed at the central part of the cable insertion tube 3 such that it has a width (in the longitudinal direction of the tube) longer than the distance Lj of a gap defined between the uneven end faces of the optical fiber cables 51a, 51b. A resin bag 5 with a length a little smaller than the length L of the heat shrinkable tube 2 is disposed covering the upper end of the resin supply hole 4.

The cable insertion tube 3 is provided with a hollow cable insertion hole 11 inside thereof. The hollow cable insertion hole 11 is composed of cable insertion parts 12 that have an inside diameter φb greater than the outside diameter Φ of the optical fiber cables 51a, 51b at both ends of the cable insertion tube 3, and cable receiving rooms 13 that have a small inside diameter φm (φb>φm) according to the outside diameter Φ of the optical fiber cables 51a, 51b inside the cable insertion parts 12 for receiving the ends of the inserted optical fiber cables 51a, 51b.

The inside wall of the cable insertion part 12 and the cable receiving room 13 is formed tapered to have a continuous surface. In this embodiment the small inside diameter φm is rendered a little larger than 250 μm such that it is slightly larger than the outside diameter Φ.

The hollow cable insertion hole 11 is further composed of a fiber receiving room 14 that has an inside diameter φs further smaller than the small inside diameter φb according to the outside diameter φ of the optical fibers 54a, 54b (which correspond to the optical fiber cables 51a, 51b, respectively) for receiving the optical fibers 54a, 54b at the central part thereof (i.e., inside of the cable receiving rooms 13). The resin supply hole 4 is formed over the center of the fiber receiving room 14.

In this embodiment, the inside diameter φs is rendered a little larger than 125 μm such that it is slightly larger than the outside diameter φ of the optical fibers 54a, 54b. The fiber receiving room 14 has a length Lf of 0.1 to 0.2 mm so as to shorten the exposed length of the optical fibers 54a, 54b as much as possible.

A step 15 is formed at the boundary of the cable receiving rooms 13 and the fiber receiving room 14 such that it acts as a covering removal member for removing the covering layer 55 of the optical fiber cables 51a, 51b being inserted into the cable insertion tube 3.

The cable insertion tube 3 needs to be accurately shaped since the outer diameter Φ of the optical fiber cables 51a, 51b and the outside diameter φ of the optical fibers 54a, 54b are very small. Therefore, the cable insertion tube 3 may be formed into a desired shape by shaping a tubular material by cutting work, electrical work such as discharge machining, or energy beam work such as laser work, electron beam work and ion beam work.

The uncured refractive index matching resin 'sr' is a liquid or jelly resin at room temperature. It normally has a network structure and is hardened by heating or irradiating ultraviolet rays such that the reaction occurs at unreacted until then to further reinforce the network.

The uncured refractive index matching resin 'sr' is filled in the resin bag 5 formed of a thin balloon etc. and the resin bag 5 is enclosed in the heat shrinkable tube 2. After curing, the uncured refractive index matching resin 'sr' can have a refractive index 'nr' (with n=about 1.463 in this embodiment) that is the same as the core 52 in FIG. 5.

The uncured refractive index matching resin 'sr' is preferably a heat curable resin or UV curable resin. In this embodiment, a heat curable resin is used as the uncured refractive index matching resin 'sr'. Of heat curable resins with the same after-curing refractive index as the core 52 in FIG. 5, a desired one has a visible light transmittance of 99% or more and can be adjusted in refractive index by additives. For example, "ADEKA nanohybridsilicone (FX-T350)" from ADEKA Corporation is available.

Of UV curable resins with the same after-curing refractive index as the core 52 in FIG. 5, a desired one can be adjusted in refractive index by additives. For example, "ADEKA nanohybridsilicone (FX-V550)" from ADEKA Corporation is available.

The length L of the optical connector 1 (or the heat shrinkable tube 2) is rendered 2 to 10 cm, preferably 3 to 8 cm, more preferably 3 to 6 cm in consideration of the strength of the connection part of the optical fiber cable or the downsizing of the optical connector. The cable insertion tube 3 is preferably shorter than the length L of the heat shrinkable tube 2.

A method for connecting the optical fiber cables 51a, 51b each other by using the optical connector 1 will be explained below.

First, as shown in FIGS. 1A and 1B, the optical connector 1 is provided. It is set in a protection sleeve fixing jig which is used in the conventional welders. Ten, the end of the two optical fiber cables 51a, 51b to be connected is cut by the ordinary cutter such as scissors and nipper such that the core, the cladding and the covering layer are cut together.

Then, the end faces of the optical fiber cables 51a, 51b formed only by cutting as above are each inserted into both sides of the cable insertion tube 3 in the heat shrinkable tube 2. When the inserted optical fiber cables 51a, 51b reach the end face of the cable receiving rooms 13, the covering layer 55 (i.e., the primary and secondary layers 55a, 55b) is removed by the step at the end face.

When the optical fibers 54a, 54b with the covering layer 55 removed reach the center of the resin supply hole 4, the insertion of the optical fiber cables 51a, 51b is stopped such that the respective end faces of the optical fibers 54a, 54b are butted at the center of the fiber receiving room 14. At this moment, the ends of the optical fiber cables 51a, 51b are each enclosed in the cable receiving rooms 13, and the optical fibers 54a, 54b with the covering layer 55 of the optical fiber cables 51a, 51b removed are enclosed in the fiber receiving room 14.

In general, when the end faces of the optical fiber cables 51a, 51b are butted each other, the butting distance (i.e., the gap between the end faces of the optical fiber cables 51a, 51b) Lj is tens of micrometers at a maximum.

Then, the heat shrinkable tube 2 is wholly heated by using a heating device such as a handy hot plate, a dryer and a soldering iron to shrink the heat shrinkable tube 2. At this moment, as shown in FIGS. 2A to 2C, the resin bag 5 is broken or split due to the contraction force of the heat shrinkable tube 2, so that the uncured refractive index matching resin 'sr' in the resin bag 5 penetrates through the resin supply hole 4 of the cable insertion tube 3 into the inside of the cable insertion tube 3 to fill the gap between the end faces of the optical fiber cables 51a, 51b as well as the resin supply hole 4.

Finally, due to the cable insertion tube 3 shorter than the protection sleeve 102, the uncured refractive index matching resin 'sr' also flows around to both ends of the cable insertion tube 3, so that almost all of the inside spaces of the shrunk heat shrinkable tube 2 are filled with the uncured refractive index matching resin 'sr'.

According as the heat shrinkable tube 2 is shrunk, the uncured refractive index matching resin 'sr' is gradually cured. When the uncured refractive index matching resin 'sr' is all cured, it forms a refractive index matching resin 'r' with the same refractive index as the core 52 in FIG. 5. Thereby, a connection part 21 of the optical fiber cables 51a, 51b can be obtained in which the refractive index matching resin 'r' and the cores of the optical fiber cables 51a, 51b are matched (or optically coupled) and fixed to each other.

Effects of the First Embodiment

The effects of the first embodiment will be described below.

The optical connector 1 is formed such that the cable insertion tube 3 is disposed within the heat shrinkable tube 2, the cable insertion tube 3 is provided with the resin supply hole 4 formed therein, and the uncured refractive index matching resin 'sr' is disposed in the heat shrinkable tube 2. Thus, it can be formed in simple composition and the number of components thereof can be reduced.

The connecting method of the two optical fiber cables 51a, 51b by using the optical connector 1 can be simply conducted such that the end of the cables is cut by the ordinary cutting tool such as scissors, the cut end faces are inserted into the cable insertion tube 3 and butted therein, and the connector 1 is heated by the simple heating device such as a handy hot plate.

Thereby, the uncured refractive index matching resin 'sr' is naturally flown out from the split resin bag 5 or the uncured refractive index matching resin 'sr' is melted and flown out by heating. The uncured refractive index matching resin 'sr' penetrates through the resin supply hole 4 into the butting part and is then cured. Thus, the end faces of the optical fiber cables 51a, 51b can be easily optically coupled and connected each other.

In other words, the optical connector 1 does not need the fiber cutting by the fiber cutter and the end face polishing at the connection part of the optical fiber cables 51a, 51b. Everyone can easy connect the optical fibers 54a, 54b as if done in electrical cable connection. Therefore, the optical connector 1 can be also called a simple optical connector.

In the optical connector 1, the resin bag 5 with the uncured refractive index matching resin 'sr' filled therein is enclosed in the heat shrinkable tube 2. Therefore, the optical fiber cables 51a, 51b can be connected each other only by shrinking the heat shrinkable tube 2.

The cable insertion tube 3 is formed tapered such that the large diameter is provided at both ends of the tube and the small diameter is provided at the central part of the tube for suiting the outside diameter Φ of the optical fiber cables 51a, 51b. Therefore, the optical fiber cables 51a, 51b can be easy inserted into the cable insertion tube 3 of the optical connector 1.

The cable insertion tube 3 can also serve as a support body for the connector itself and for the connection part 21 of the optical fiber cables. Therefore, the optical connector 1 and the connection part 21 of the optical fiber cables can be prevented from folding or bending so that the strength of the optical connector 1 can be enhanced.

The refractive index matching resin 'sr' used in the optical connector 1 can have the same refractive index as the core 52 after curing. Therefore, even when the fiber cut surface is roughened (See FIG. 2B) as the optical fiber cables 51a, 51b are cut by the ordinary tool, the after-curing refractive index matching resin 'r' and the cores of the optical fiber cables 51a, 51b can be matched in refractive index. Namely, the after-curing refractive index matching resin 'r' can serve as both a refractive index adjuster and an adhesive.

In particular, since the butting distance Lj at the connection part 21 of the optical fiber cables is as short as about 1 mm, loss in light to be transmitted therethrough is little caused if the gap between the end faces of the optical fiber cables 51a, 51b has nearly the same refractive index as the core 52.

The optical connector 1 is provided with the cable receiving room 13 and the fiber receiving room 14 according to the outside diameter ϕ of the optical fibers 54a, 54b which are formed in the cable insertion tube 3. The step 15 is formed at the boundary of the cable receiving room 13 and the fiber receiving room 14 for removing the covering layer 55 at the end of the connection part of the optical fibers.

Therefore, the optical connector 1 does not need the additional step of removing the covering layer 55 of the optical fiber cables 51a, 51b since the covering layer 55 can be automatically removed simultaneously when the optical fiber cables 51a, 51b are inserted into the cable insertion tube 3.

Thus, with the optical connector 1, the respective end faces of the optical fibers 54a, 54b as a naked optical fiber can be optically coupled. Therefore, as compared to the case of optically coupling the end faces of the optical fiber cables 51a, 51b, the connection loss is reduced and the eccentricity of the optical fibers 54a, 54b lowers, so that the optical fibers can be connected each other with a high accuracy.

Second Embodiment

The second preferred embodiment of the invention will be explained below referring to FIG. 3.

As shown in FIG. 3, an optical connector 31 of the second embodiment is constructed such that, adding to the construction of the optical connector 1 in FIG. 1A, a sharp circular edge (blade) 32 is provided at the boundary of the cable receiving room 13 and the fiber receiving room 14 as a covering removal member for removing the covering layer 55 of the optical fiber cables 51a, 51b being inserted into the cable insertion tube 3

Therefore, the optical connector 31 does not need the additional step of removing the covering layer 55 of the optical fiber cables 51a, 51b since the covering layer 55 can be automatically and securely removed simultaneously when the optical fiber cables 51a, 51b are inserted into the cable insertion tube 3.

Third Embodiment

The third preferred embodiment of the invention will be explained below referring to FIG. 4.

As shown in FIG. 4, an optical connector 41 of the third embodiment is constructed such that, adding to the construction of the optical connector 31 in FIG. 3, a circular escape space 42 is provided around the axis of the fiber receiving room 14 to communicate the cable receiving room 13 with the insertion direction of the optical fiber cables 51a, 51b for allowing the escape or accommodation of the removed (or peeled) secondary layer 55b.

In the optical connector 41, the removed covering layer 55 is automatically shrunk or received in the escape space 42 when the optical fiber cables 51a, 51b are inserted into the cable insertion tube 3.

Therefore, the optical connector 41 allows further simplification of the connection work and further lowering in eccentricity of the optical fibers 54a, 54b.

In the above embodiments, the resin bag 5 is exemplarily enclosed in the heat shrinkable tube 2. Alternatively, a resin tube formed of the uncured refractive index matching resin 'sr' may be enclosed in the heat shrinkable tube 2 such that the uncured refractive index matching resin 'sr' is provided in the heat shrinkable tube 2.

The optical fiber cable 51 as shown in FIG. 5 allows the internal optical fiber 54 to be broken as well as allowing the external covering layer 55 to be broken (or cut away) by bending. Thus, regardless of the existence of the covering layer 55, the optical fiber with the covering layer can be broken (cut away) by folding the optical fiber cable 51 by hand.

Thus, the optical connector 1, 31 or 41 can be also used such that the end faces of the optical fiber cables 51a, 51b formed by breaking (or cutting) by hand can be butted and connected each other in the cable insertion tube 3.

Optionally, plural protrusions for sticking the resin bag 5 according to the contraction of the heat shrinkable tube 2 may be provided on the periphery of the cable insertion tube 3 and in the proximity of the resin supply hole 4.

In the above embodiments, the uncured refractive index matching resin 'sr' filled in the resin bag 5 is in an amount to fill almost all of the spaces (or gaps) in the heat shrinkable tube 2 after curing. However, it may be in an amount a little exceeding almost all of the spaces (or gaps) in the heat shrinkable tube 2 after curing. In this case, the excessive refractive index matching resin 'r' is flown out from both ends of the heat shrinkable tube 2 after curing and hardened such that the optical fiber cables 51a, 51b can be firmly bonded to the heat shrinkable tube 2 after curing. Thereby, the strength of the connection part of the optical fiber cable can be also enhanced.

In the above embodiments, the optical fiber cable 51 uses the covering layer 55 with the two layer structure. However, the optical fiber cable 51 may use a cover layer with a single structure formed of, e.g., a UV curable resin.

The optical fiber composing the optical fiber cable may be a multi-mode optical fiber when the transmission speed is 10 Gbit/s or less or the total length of the optical fiber is 500 m or less.

In the above embodiments, the refractive index matching resin 'sr' is exemplarily used as the uncured refractive index matching resin. Alternatively, an optical instantaneous adhesive material may be used as the uncured refractive index matching resin.

In case of using the optical instantaneous adhesive material, the protection sleeve is preferably formed with a compliant or elastic tubular member formed of an elastic material such as rubber or resin. In this case, an adhesive material bag with the optical instantaneous adhesive material filled therein is applied a relatively low pressure from outside the protection sleeve. Thereby, the optical instantaneous adhesive material leaks from the adhesive material bag and penetrates through a supply hole into the butting part, where it is instantaneously cured. Thus, the end faces of the optical fiber cables 51a, 51b can be simply optically coupled each other.

For example, the optical instantaneous adhesive material is preferably cyanoacrylate room-temperature curing instantaneous adhesives, light curing instantaneous adhesives, or one or two-component epoxy resin room-temperature curing instantaneous adhesives. The cyanoacrylate room-temperature curing instantaneous adhesives include cyanoacrylate as a major component and act to be cured at room temperature by absorbing moisture in the air.

The light curing instantaneous adhesives act to be instantaneously cured at a site to which it penetrates through an applied body and also to be cured due to light-anion polymerization by irradiating it with light (UV or visible light). The light curing instantaneous adhesives are provided with merits of both of instantaneous adhesives and light curing resins.

The one-component epoxy resin room-temperature curing instantaneous adhesives act to be cured at room temperature by reacting an epoxy resin as a base compound with a curing agent such as polyamines added thereto. On the other hand, the two-component epoxy resin room-temperature curing instantaneous adhesives act to be cured at room temperature by mixing a base compound (component A) with a curing agent (component B) formerly separated therefrom.

In case of using the two-component epoxy resin room-temperature curing instantaneous adhesives as the optical instantaneous adhesive material, the adhesive material bag is composed of two divided bags, i.e., a base compound bag with the base compound filled therein and a curing agent bag with the curing agent filled therein. In this case, the adhesive material bag is designed such that the base compound bag and the curing agent bag can be simultaneously split or broken by applying a relatively low pressure thereto.

EXAMPLES

Figure 6A:
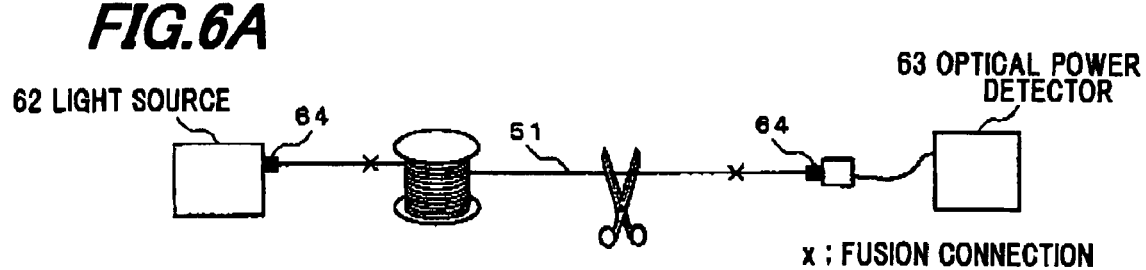
FIGS. 6A and 6B are diagrams illustrating a connection loss evaluation test conducted at the connection part of the optical fiber cores upon using the optical connector in FIG. 1A.
Figure 6B:
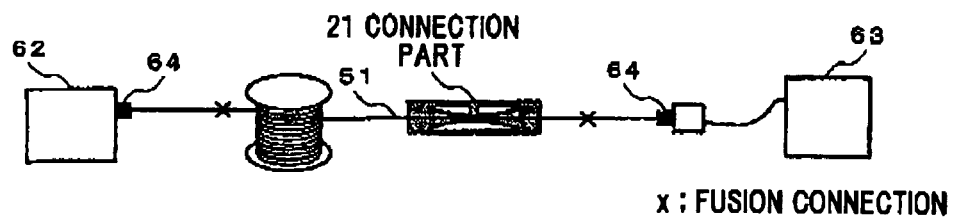

In the connection loss evaluation test system as shown in FIGS. 6A and 6B, the optical fiber cable 51 is cut by scissors (FIG. 6A) at a part for butting connection ends without removing the covering layer 55. Then, the optical fiber cables 51a, 51b are connected each other by the optical connector 1 as shown in FIG. 1A to provide the connection part 21 of the optical fiber cables (FIG. 6B).

The optical fiber 54 is an ordinary SMF (single-mode optical fiber), a light source 62 is a stabilized light source LD-MG923A from Anritsu Corporation with a wavelength of 1.55 μm, and an optical power detector 63 is a power meter AQ2140 from Ando Electric Co., Ltd. An SMF (with a length of 4000 m) (not shown) with FC connectors 64 attached at both ends thereof is directly connected between the light source 62 and the optical power detector 63 as a reference for the connection loss evaluation.

The fiber connection via the connection part 21 as above is repeated five times. As a result, the connection loss is all measured 0.30 dB or less. When temperature is changed between −40° C. and 85° C., the connection loss and the return loss are each nearly constant.

As described, where the optical fiber cables 51a, 51b are cut by scissors and the respective end faces of the optical fibers 54a, 54b are connected each other via the connection part 21 of the optical fiber cables, the connection loss does not matter on the aspect of practical use. It will be appreciated that the refractive index matching material such as a refractive index matching resin or an optical instantaneous adhesive material used for the optical connector only has to have the same refractive index as the core after curing.

Thus, in connecting the optical fibers, the invention does not need cutting work using a specialized tool such as a fiber cutter, polishing work etc. and therefore it can save time, cost and steps. In addition, every worker can easy conduct the connection work by using the optical connector of the invention.

The invention can apply not only to the optical fiber connection for communications but also to the optical fiber connection for various industrial products such as an industrial robot where optical fibers are difficult to use in terms of the conventional optical fiber connection technique since it has many components and connection points. Thus, also in the industrial products, the optical fiber can be easy connected without additional steps.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical connector for optically coupling respective end faces of two optical fiber cables comprising an optical fiber comprising a core and a cladding and a covering layer covering the optical fiber, comprising:
    a protection sleeve;
    a cable insertion tube disposed in the protection sleeve for inserting thereinto and butting the respective end faces of the two optical fiber cables;
    an uncured refractive index matching material disposed between the protection sleeve and the cable insertion tube; and
    a supply hole formed in the cable insertion tube for supplying the uncured refractive index matching material to an inside of the cable insertion tube,
    wherein the cable insertion tube comprises a cable receiving room for receiving an end of the two optical fiber cables inserted, a fiber receiving room for receiving the optical fiber, and a covering removal member formed at a boundary of the cable receiving room and the fiber receiving room for removing the covering layer.

2. The optical connector according to claim 1, wherein the covering removal member comprises a step or an edge formed at the boundary of the cable receiving room.

3. The optical connector according to claim 1, wherein the cable insertion tube further comprises an escape space around the cable receiving room for allowing escape and accommodation of the covering layer removed by the covering removal member.

4. The optical connector according to claim 1, further comprising:
    a bag with the uncured refractive index matching material therein or a tube formed of the uncured refractive index matching material, wherein the bag or the tube is enclosed in the cable insertion tube.

5. The optical connector according to claim 1, wherein the cable insertion tube is formed tapered such that it has a large diameter at both ends thereof for inserting the optical fiber cables, and a small diameter at a central region according to an outside diameter of the optical fiber cables.

6. The optical connector according to claim 1, wherein the cable insertion tube comprises a metal tube or a glass tube.

7. The optical connector according to claim 1, wherein the uncured refractive index matching material has nearly a same refractive index as the core after curing.

8. The optical connector according to claim 1, wherein the refractive index matching material comprises a heat curable resin, a ultraviolet curable resin, a cyanoacrylate room-temperature curing instantaneous adhesive, a light curing instantaneous adhesive, or an one or two-component epoxy resin room-temperature curing instantaneous adhesive.

* * * * *